United States Patent
Fletcher et al.

[11] 3,996,070
[45] Dec. 7, 1976

[54] THERMOCOUPLE INSTALLATION

[76] Inventors: James C. Fletcher, Administrator of the National Aeronautics and Space Administration, with respect to an invention of; Walter B. Powell, Altadena; Lee R. Potter, Pasadena; Kenton S. MacDavid, Altadena, all of Calif.

[22] Filed: Nov. 22, 1974

[21] Appl. No.: 526,450

[52] U.S. Cl. .................. 136/233; 136/232
[51] Int. Cl.² .......................... H01V 1/04
[58] Field of Search ............ 136/242, 233, 232

[56] References Cited
UNITED STATES PATENTS

| | | | |
|---|---|---|---|
| 3,305,405 | 2/1967 | Jamieson | 136/232 |
| 3,395,051 | 7/1968 | Pisarz | 136/242 |
| 3,492,170 | 1/1970 | Davis et al. | 136/233 |
| 3,513,432 | 5/1970 | Davis | 136/233 UX |
| 3,592,061 | 7/1971 | Schwedland | 136/233 |
| 3,649,368 | 3/1972 | Sine | 136/232 |
| 3,713,899 | 1/1973 | Sebestyen | 136/233 |
| 3,898,431 | 8/1975 | House et al. | 136/233 |

*Primary Examiner*—Nelson Moskowitz
*Attorney, Agent, or Firm*—Monte F. Mott; Wilfred Grifka; John R. Manning

[57] ABSTRACT

A thermocouple assembly which includes a plug having a pair of small diameter holes near one end thereof which are spaced a small distance apart to leave a thin quantity of plug material between the holes, and a pair of thermocouple wires extending through the different holes and with the outer ends of the wires joined to the thin quantity of plug material which lies between the holes to form a thermocouple junction.

7 Claims, 12 Drawing Figures

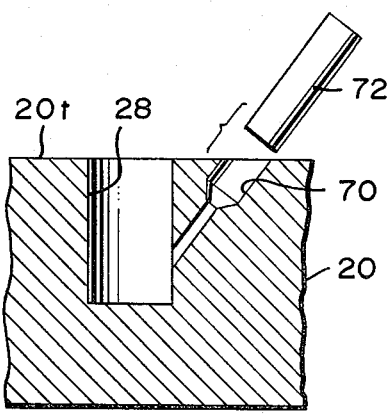
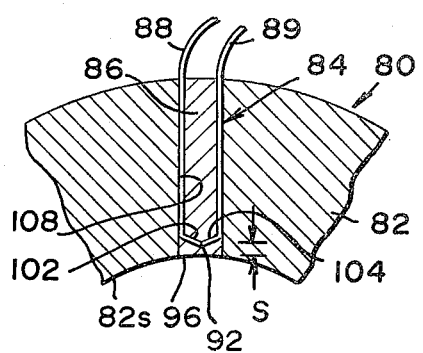
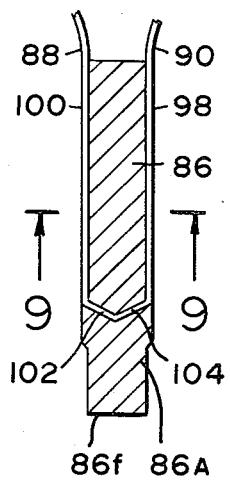
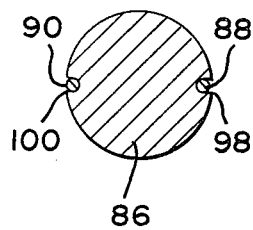
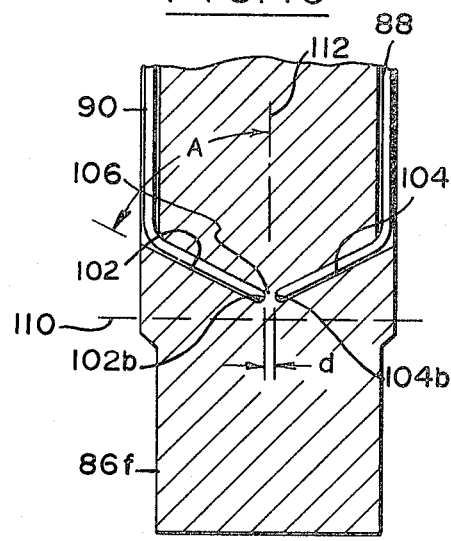
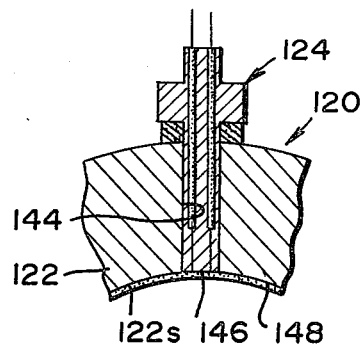
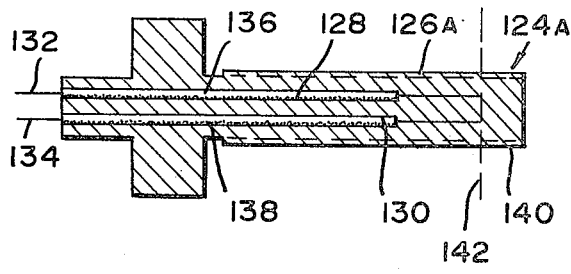

THERMOCOUPLE INSTALLATION

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

This invention relates to thermocouple installations.

In the development of rocket engines and in other applications where there is rapid heating of a flat or curved plate or other mass, it is often necessary to obtain transient temperature data. Of course, the temperature sensors should not cause local changes in the transient temperature characteristics. Miniature thermocouple junctions can be readily inserted into small holes drilled into a plate to lie at any chosen depth. However, heat may not be rapidly conducted between the walls of the hole and the thermocouple. The errors in transient temperature readings can be significant where the plate is subjected to extremely rapid heating, as at the nozzle of a jet engine, and where transient temperature data is utilized in the analysis of the engine.

SUMMARY OF THE INVENTION

In accordance with one embodiment of the present invention, a thermocouple installation is provided of a type wherein a thermocouple plug assembly is installed in a hole in a plate, in which the plug assembly is constructed to assure intimate coupling of the thermocouple junction to the material of the plug. The plug assembly includes a plug with a pair of small diameter holes near one end thereof, the holes being spaced a small distance apart to leave a thin quantity of plug material between them. A pair of thermocouple wires extend through the holes, and their ends are welded to the thin quantity of plug material lying between the holes. As a result, the thermocouple junction is intimately coupled to the material of the plug so that heat is readily conducted from the plug material to the junction. The welding of the ends of fine thermocouple wires to the plug material is readily accomplished with a short and moderate burst of welding energy, so that the only distortions created are at the thin region of plug material which melts to weld to the tips of the thermocouple wires.

In one thermocouple plug assembly, a plug is bored with a blind hole to leave a thin web or diaphragm of plug material at the thermocouple end of the plug. A pair of small diameter holes is then formed in the web and a pair of thermocouple wires are installed in the plug with the outer ends of the wires projecting through the small holes in the web. A pulse of welding energy is applied to the web, as from a laser focused to cover the ends of both wires and the region of the web lying between them. This results in the tips of both wires being welded to the web of the plug to form a thermocouple junction. A plug-receiving blind hole is then formed in a plate to the desired depth at which temperature measurements are to be taken. The thermocouple plug is installed in the plugreceiving hole, with the thermocouple lying at the bottom of the hole, and the plug is then brazed into the hole.

In another thermocouple installation, wherein it is desired to measure temperatures at the surface of a plate, a plug is formed with a pair of narrow blind holes extending into opposite sides of the plug at locations spaced a small distance from the thermocouple end of the plug. The small diameter holes are formed so that their bottoms are spaced a small distance apart to leave a thin quantity of plug material between them. Each wire of a pair of thermocouple wires is inserted to the bottom of a different one of the narrow holes, and a pulse of current is passed through the thin region of the plug material between the holes to weld the plug material to the tips of the wires. The plug is inserted into a through hole formed in a plate whose surface temperature is to be measured, and the end of the plug is ground precisely flush with the surface of the plate.

The novel features of the invention are set forth with particularity in the appended claims. The invention will be best understood from the following description when read in conjunction with the accompanying drawings.

BRIEF DESCRIPTION OF THE DRAWINGS

FIG. 6 is a partially sectional side view of a portion of the engine of FIG. 1, showing the manner in which the thermocouple plug is installed;

FIG. 7 is a partial sectional side view of a thermocouple installation constructed in accordance with another embodiment of the invention;

FIG. 8 is a sectional side view of the plug assembly of the installation of FIG. 7, shown prior to final formation;

FIG. 9 is a view taken on the line 9—9 of FIG. 8;

FIG. 10 is an enlarged view of an end of the plug of FIG. 8;

FIG. 11 is a sectional side view of a thermocouple installation constructed in accordance with still another embodiment of the invention; and FIG. 12 is a sectional side view of the plug of FIG. 11, shown prior to final fabrication.

DESCRIPTION OF THE PREFERRED EMBODIMENTS

Figure 1:
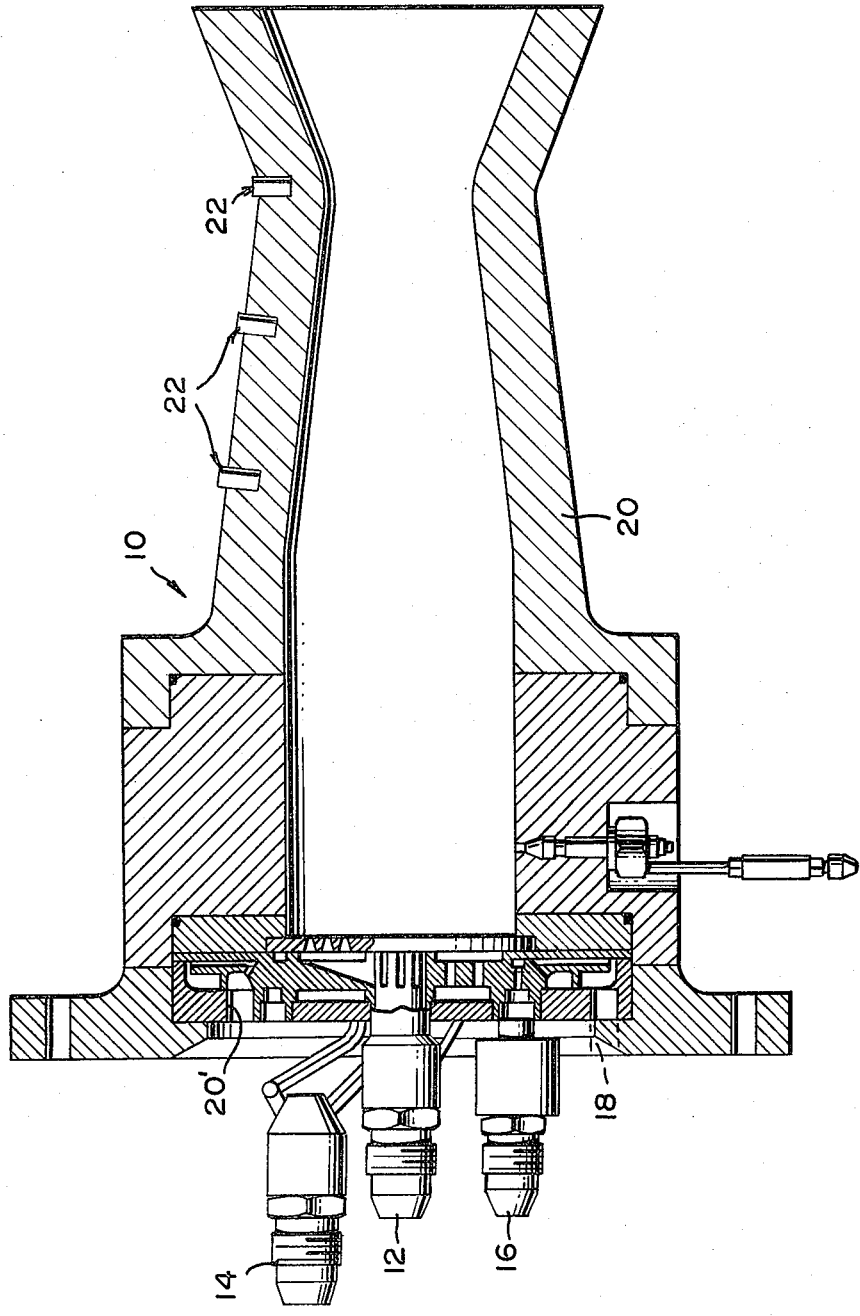
FIG. 1 is a partial sectional view of a rocket engine in which there has been installed thermocouple plugs constructed in accordance with one embodiment of the present invention.

FIG. 1 illustrates a thrust chamber apparatus 10 utilized in a series of tests which were conducted to determine the performance and heat transfer characteristic of a particular rocket propellant. Fuel and oxidizer were injected through inlets 12, 14 while boundary layer coolant was injected at an inlet 16 and an injector face coolant was injected at 18 and expelled at 20. During a test period of approximately 8 seconds, temperatures of the nozzle wall were taken at different locations therealong and at accurately known depths within the wall by a series of thermocouple installations 22. Each of the installations had the general configuration shown in FIG. 2, wherein each installation included a plug assembly 24 containing a thermocouple junction 26. The plug assembly 24 had been installed in an accurately machined blind hole 28 formed in the curved plate or wall 20 of the rocket chamber, and with the thermocouple 26 lying at the bottom of the hole to sense the temperature in the plate thereat.

The thermocouple plug assembly 24 of the present invention includes a plug 30 of material having substantially the same thermal conductivity characteristics as the plate 20. In the installation of FIG. 1, the nozzle wall 20 is formed of OFHC copper (an oxygen-free copper) while the plug 30 is formed of tellurium copper to improve machinability, the difference in thermal properties between these copper materials being negligible. The plug 30 is formed with a blind hole 32 which extends from a first end 34 of the plug and along most of the length of the plug to a position near a second or thermocouple end 36 of the plug. The blind hole 32 leaves a web or diaphragm portion 38 at the thermocouple end of the plug. The hole 32 is actually formed with bores 32s, 32m, 32d of decreasing diameters at positions progressively closer to the thermocouple end, to facilitate the installation of the thermocouple wires while minimizing changes in the thermal conductivity characteristics of the installation near the thermocouple 26.

The plug assembly includes a pair of thermocouple wires 40, 42 which are insulated by insulator sleeves 44 that extend down to the bottom of a layer of ceramic cement 46. The bare wires then extend into another layer 48 of ceramic cement and into different bores of a double-bore ceramic insulating member or tube 50. The outer ends of the wires extend through holes in the web 38 and are welded to the web 38 of the plug 30 to form a thermocouple junction which is integral with the material of the plug 30. The temperature at the thermocouple 26 can be readily determined by maintaining the inner ends 40i, 42i of the thermocouple wires at a known temperature (such as room temperatures) and by utilizing a meter 52 or other devices to measure the voltage developed between the wires.

Figure 3:
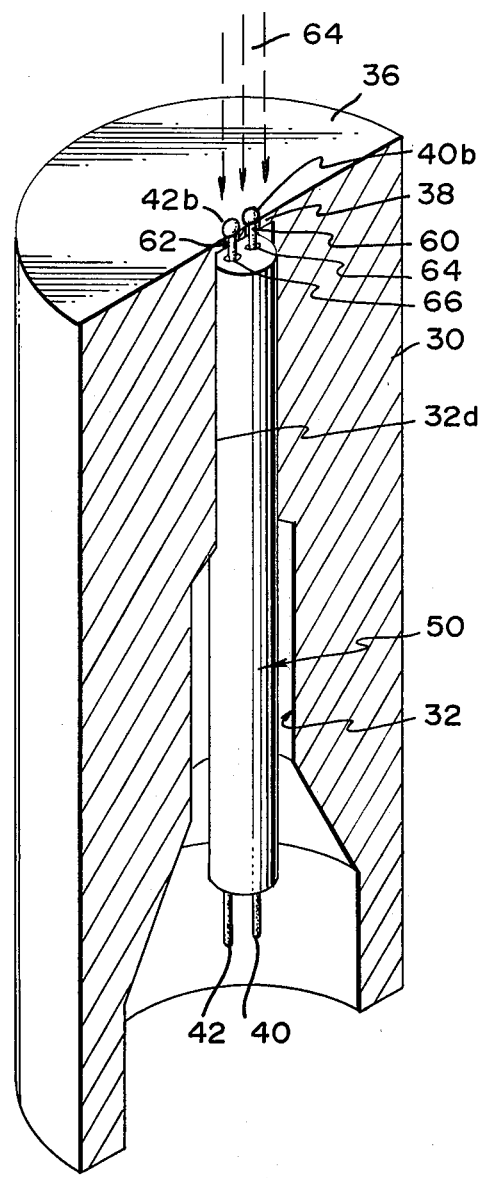
FIG. 3 is a sectional perspective view of a portion of the plug assembly of FIG. 2, shown during a state of the construction thereof.
Figure 4:
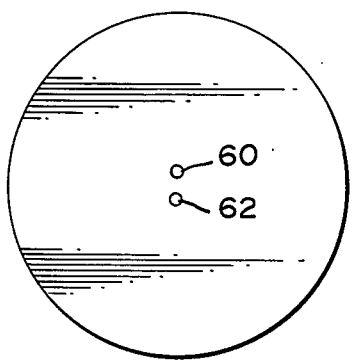
FIG. 4 is an end view of the assembly of FIG. 3.

The thermocouple plug assembly 24 is constructed in a manner shown in FIG. 3 by forming the blind hole 32 in the plug 30, with the deepest portion 32d of the hole accurately machined to leave a web 38 between the bottom of the hole and the thermocouple end 36 of the plug. Two small diameter holes 60, 62 are formed in the web from the inside thereof which lies at the bottom of the blind hole 32 to the outside thereof which lies at the second end 36 of the plug. The two thermocouple wires 40, 42 are prepared for installation by forming a spherical enlargement or ball 40b, 42b on the outer end of each wire, as with a pulse of a laser beam. Both Chromel-Alumel wire pairs and Platinel-Platinel thermocouple wire pairs have been utilized, with the end of the wire protected against oxidation from the laser pulse with an argon purge.

Figure 5:
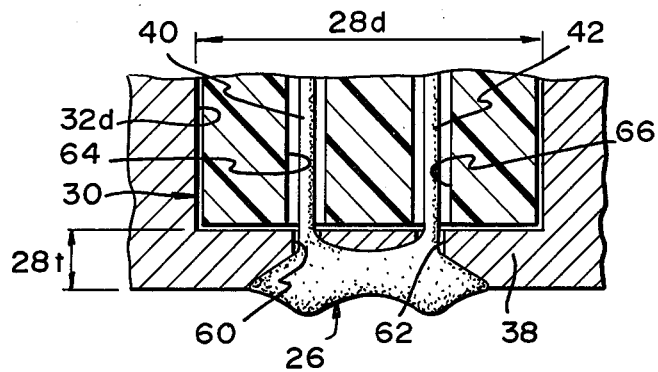
FIG. 5 is a greatly enlarged sectional side view of the thermocouple end of the assembly of FIG. 2, shown after the welding step of FIG. 3, but prior to finishing.

The thermocouple wires with the balls on their ends are then threaded through the holes 60, 62 in the web or diaphragm and through similarly-spaced bores 64, 66 in the insulator tube 50. The plug is mounted in the orientation of FIG. 3, with the thermocouple end 36 uppermost and with the top of the insulator tube 32 spaced an appreciable distance from the web 38, such as 1/16th inch. A lightweight clamp is attached to the bottom of each wire 40, 42 to provide a slight tension that keeps the balls 40b, 42b in firm contact with the top surface of the web 38. Then, a laser beam, indicated at 64, is directed at the wire ends and the web. The laser beam is focused to cover both spherical wire ends as well as the web portion between them, and is directed in a controlled pulse to fuse the tips of the wires into the diaphragm and thereby form an integral thermocouple junction, as shown at 26 in FIG. 5. The thermocouple end is then flattened, as by lightly stroking it with a fine abrasive.

Figure 2:
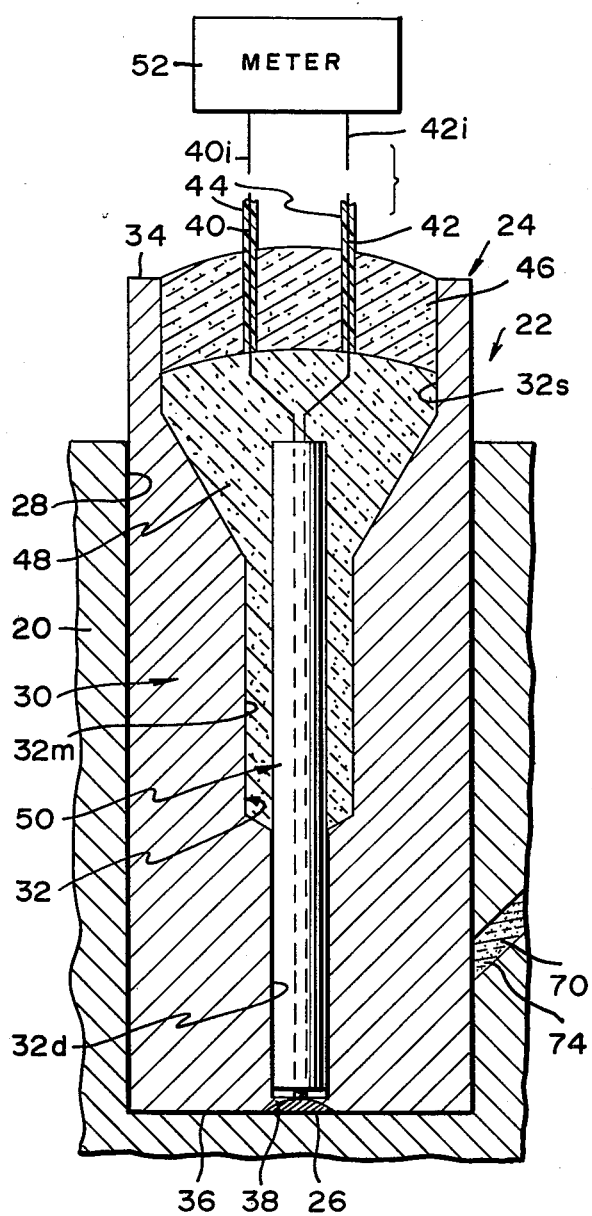
FIG. 2 is an enlarged sectional side view of one of the thermocouple plug installations illustrated in FIG. 1.

The plug with the completed thermocouple junction is then turned over so that thermocouple end 36 is at the bottom, and the high-temperature ceramic insulating cement 48 is installed in the hole 32 to cement the insulator tube 50 in place. The projecting portions of the wires 40, 42 are spread apart as shown in FIG. 2, before the cement begins to harden. After the cement 48 has been cured, insulator sleeves 44 are slipped over the wires, and additional cement 46 is installed to fill the hole in the plug.

The thermocouple plug assembly 24 is installed in the plate 20, in the manner shown in FIG. 6, by forming a blind hole 28 in the plate and by additionally forming a diagonal brazing feed hole 70 in the plate which extends from a position spaced from the hole 28 at the top surface 20t of the plate and which intersects the plug-receiving hole 28 at a location near the bottom thereof. The thermocouple plug 24 is fully inserted into the plug-receiving hole 28 and a feed-tube 72 is inserted into the feed hole 70. A brazing wire or slurry of lower melting temperature than the plug or wires is fed through the tube 72 and through the bottom of the feed hole 70. The assembly is then heated to complete the brazing operation so that the brazing material 74 (FIG. 2) thermally couples the walls of the plug 30 to the walls of the plug-receiving hole 28, in a coupling of very low thermal resistivity. The thermocouple installation is then complete, and the inner ends 40i, 42i may be connected to the terminals of the meter 52 and/or to a cold junction to enable temperature measurements to be taken.

In one thermocouple installation, a thermocouple plug 30 of 0.250 inch diameter and 0.600 inch length was utilized, with a web 28 of a thickness 28t (FIG. 5) of 0.005 inch, with holes 60, 62 in the web of 0.006 inch diameter and spaced 0.010 inch apart, and with the diameter 28d of the web being 0.036 inch. The thermocouple wires 40, 42 were each of 0.005 inch diameter, and were formed with balls 40b, 42b each of approximately 0.009 inch diameter (i.e. larger than the holes 60, 62). A description of this thermocouple plug installation and the method utilized therefor is contained in technical report 32-1588 of the National Aeronautics and Space Administration entitled "Analysis of Transient Heat Flow to Thick-Walled Plates and Cylinders" by W. B. Powell.

FIGS. 7–10 illustrate a thermocouple installation 80 constructed in accordance with another embodiment of the invention, and which is especially useful for measuring the temperature at the surface 82s of a plate 82. The installation includes a thermocouple plug assembly 84 having a plug 86 constructed of substantially the same material as the surrounding plate 82, and a pair of thermocouple wires 88, 90. The wires have tips that form a thermocouple junction 92 at a location close to a thermocouple end 96 of the plug which is flush with the adjacent surface 82s of the plate. The thermocouple wires 88, 90 extend along slots 98, 100 formed along opposite sides of the plug, and extend into narrow diagonal holes 102, 104 whose bottom portions are slightly spaced apart. The tips of the thermocouple wires are welded to the thin quantity of plug material between the holes 100, 102.

The plug assembly is constructed in the manner illustrated in FIGS. 8-10, by first forming a plug body 86A with a pair of grooves 98, 100 and with a pair of diagonal holes 102, 104 that intersect the ends of the grooves. The plug initially has a forward portion 86f which aids in handling and which provides a region to be later ground off.

The diagonal holes 102, 104 are formed in the manner shown in FIG. 10, with their bottoms 102b, 104b spaced a small distance apart to leave a thin quantity of plug material 106 therebetween. The thermocouple wires 88, 90 have insulation, with the insulation being stripped off at the ends, and the wires are inserted into the diagonal holes 102, 104 and held with their tips against the bottom of the holes. A brief pulse of welding current is then passed through the thin plug portion 106 to weld the tips of the wires 88, 90 to the plug portion 106 and thereby form a thermocouple junction. After the wires are welded at the thermocouple location, they are led along the grooves 98, 100 and potted in place with cement. The front portion 86f of the plug is then cut off as at the line 110 indicated in FIG. 10, so that the thermocouple junction lies a small distance from the cut end of the plug.

The plug assembly 84 is installed in the plate 82 by forming a plug-receiving hole 108 in the plate to provide a slight interference fit with the plug, so that the plug can be press fitted into the hole and it will securely remain in place therein. After the plug is installed so that its thermocouple end 96 extends a minute distance from the plate surface 82s, the thermocouple end of the plug is accurately ground flush with the surrounding plate surface.

A plug installation of the type illustrated in FIG. 7 has been constructed with a plug 86 of a nominal outside diameter of 0.25 inch, and with Chromel and Alumel thermocouple wires 88, 90 having 0.005 inch diameters and surrounded by insulation having an outer diameter of 0.012 inch. The grooves 98, 100 were machined to a width and depth of 0.020 inch, and the diagonal holes 102, 104 were formed with a diameter of 0.015 inch. The diagonal holes 102, 104 were formed at an angle A of 60° with the axis 112 of the plug so that the thermocouple location could be located extremely close to the surface of the plate. The diagonal holes were formed to an accurately determined depth so that the distance $d$ between the bottom of the diagonal blind holes was approximately 0.010 inch. A spring-loaded jig was utilized to drive the wires to the bottom of the diagonal holes and the wires were welded by the discharge of a capacitor of approximately 180 microfarad capacitance which had been charged to approximately 100 volts. After the plug assembly had been inserted into the plate and ground flush, the thermocouple had been located a distance s of approximately 0.020 inch from the end 96 of the plug.

FIGS. 11 and 12 illustrate still another thermocouple installation 120 which is utilized to measure the temperature at the surface 122s of a plate 122. The thermocouple installation includes a plug assembly 124 formed from a conventional delta thermocouple assembly of the type shown at 124A in FIG. 12.

The delta thermocouple assembly 124A includes a plug 126A with a pair of holes 128, 130 that hold a pair of thermocouple wires 132, 134 that are insulated by insulator sleeves 136, 138. In order to convert the thermocouple plug assembly 124A, threads on the outside of the plug body 126A were machined off to leave a smooth outside and the thermocouple end 140 of the plug was cut off along the line 142 so that the insulated thermocouple wires were exposed. The plug was then press-fitted into a hole 144 machined into the plate 122, with the thermocouple end protruding slightly beyond the surface 122s, and the thermocouple end of the plug was then ground flush with the surface 122s. Then, electroless nickelplate was applied to the surface 122s of the plate to form a conductive layer 148 to cover the plate surface as well as the exposed end 146 of the thermocouple assembly, the nickelplating of approximately 0.001 inch thickness serving to electrically connect the exposed ends of the thermocouple wires to form a thermocouple junction, and to thermally couple the junction to the plate. Thus, a thermocouple junction was formed in a simple manner at the surface of the plate by modifying an available thermocouple assembly.

The invention therefore provides relatively simple thermocouple installations which permit the measurement of transient temperature data at a selected position of a plate, with the position being either inside the plate or at a surface thereof. A thermocouple junction can be formed that is intimately joined with the material of a plug, and with the junction region surrounded by plug material to minimize errors in temperature measurements, by forming closely spaced holes in a plug of material and welding the tips of thermocouple wires to the thin region of plug material lying between the holes. In one thermocouple installation, this is accomplished by forming a wide blind hole through the plug to leave a web at the thermocouple end, forming small holes in the web, projecting wires through the holes, and welding the tips of the wires to the outer end of the plug at the web thereof. In another thermocouple installation, a pair of sidewardly extending holes are formed from opposite sides of thermocouple plug, with the bottom portions of the holes spaced a small distance apart, and with the thermocouple wires welded to the thin region of plug material lying between the holes. Still another thermocouple installation utilizes a conventional delta thermocouple assembly, with an end of the conventional plug assembly cut off and installed flush with a plate wall, and with the plate wall thereafter plated with metal to interconnect the thermocouple wires at the cut-off location.

Although particular embodiments of the invention have been described and illustrated herein, it is recognized that modifications and variations may readily occur to those skilled in the art and consequently, it is intended that the claims be interpreted to cover such modifications and equivalents.

What is claimed is:
1. A thermocouple installation comprising:
   a plate-like mass with a surface;
   a pair of insulated wires extending through said mass and having exposed ends lying flush with said surface of said mass; and
   a thin electrically and thermally conductive plating layer lying on said surface of said mass and on said exposed ends of said wires, said layer electrically interconnecting said wires and thermally connecting said wires to the adjacent portion of said mass.
2. A thermocouple installation comprising:

a mass with a hole therein which extends from a first surface of said mass to a predetermined depth from said first surface;

a plug of highly heat conductive material with a first end and with a second end lying at the bottom of said hole and substantially filling the bottom of said hole and thermally joined to the walls of said hole;

said plug having a blind hole extending from said first end and along most of the distance therefrom toward said second end to leave a web of material between the bottom of said blind hole and said second end of said plug with the web being contiguous with the rest of the plug, said web having a pair of small diameter holes extending completely through said web; and a pair of thermocouple wires extending through said blind hole, said wires having outer ends extending into different ones of said small diameter holes in said web and welded to each other and to said web.

3. The assembly described in claim 2 wherein: said weld of said wire ends and web lie on the end face of said plug.

4. A thermocouple installation for measuring transient temperature data at a known location within a mass comprising:

a mass of material with a blind hole extending from a first surface thereof;

a plug formed of substantially the same material as said mass, said plug having first and second ends, said plug lying in said blind hole with said second end lying at the bottom of said blind hole; and said plug joined in a highly heat conductive joint to the wall of said blind hole at least along the bottom portion of said blind hole;

said plug having a blind hole extending from said first end of said plug along most of the distance therefrom towards said second end of said plug to leave a web of material between the bottom of said blind hole in said plug and said second end thereof, said web having a pair of through holes extending therethrough;

a pair of thermocouple wires extending along said blind hole in said plug and with each wire having an outer and extending through a different one of said holes in said web and welded to the outer face of said web, so that the thermocouple junction lies at the bottom of said holes; and means coupled to said thermocouple wires for measuring electricity therefrom.

5. A thermocouple assembly comprising:

a plug having a first end portion and having a second opposite end portion with a pair of blind small diameter holes, said small diameter holes having outer ends lying at spaced locations on the perimeter of the plug and having bottoms spaced a small distance apart within said plug; and a pair of thermocouple wires extending into different ones of said small diameter holes, each wire having an outer end at the bottom of a corresponding hole;

the region of said plug lying between the bottoms of said small diameter holes, and the outer ends of said wires, all being welded together in a weld region contiguous to the plug area that forms said small diameter holes.

6. The thermocouple assembly described in claim 5 wherein:

said plug has a longitudinal groove extending along each side from the first end portion thereof to the outer end of a corresponding one of said small diameter holes; and each of said wires extends along a corresponding one of said grooves.

7. The thermocouple assembly described in claim 5 wherein:

said blind holes are substantially straight and extend at an angle of more than 30° and less than 90° with the axis of said plug, so that the bottoms of said small diameter holes lie closer to the second end of said plug than the ends of said small diameter holes which lie at the side of said plug, and the distance between the bottoms of said holes and said second end of said plug is less than one-fifth the diameter of said plug.

* * * * *